(12) United States Patent
De Angelis et al.

(10) Patent No.: US 8,683,827 B2
(45) Date of Patent: Apr. 1, 2014

(54) METHODS AND APPARATUS FOR THERMALLY CONDITIONING MOLTEN GLASS

(71) Applicants: Gilbert De Angelis, Lindley, NY (US); Raymond Eugene Fraley, Waverly, NY (US); John Jerry Kersting, Painted Post, NY (US)

(72) Inventors: Gilbert De Angelis, Lindley, NY (US); Raymond Eugene Fraley, Waverly, NY (US); John Jerry Kersting, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 61 days.

(21) Appl. No.: 13/655,939

(22) Filed: Oct. 19, 2012

(65) Prior Publication Data
US 2013/0042651 A1   Feb. 21, 2013

Related U.S. Application Data

(62) Division of application No. 12/619,881, filed on Nov. 17, 2009, now Pat. No. 8,408,029.

(51) Int. Cl.
  *C03B 5/20* (2006.01)
  *C03B 5/18* (2006.01)
(52) U.S. Cl.
  USPC .......................... 65/135.1; 65/134.1
(58) Field of Classification Search
  USPC ............ 65/134.1–136.4, 376–540, 106, 107, 65/172–176
  See application file for complete search history.

(56) References Cited

U.S. PATENT DOCUMENTS

| | | | |
|---|---|---|---|
| 1,888,039 A | 11/1932 | Huff | 138/147 |
| 3,771,988 A | 11/1973 | Starr | 65/337 |
| 3,810,743 A | 5/1974 | Rau | 5/29.21 |
| 4,296,921 A | 10/1981 | Hayashi | 266/270 |
| 4,344,785 A | 8/1982 | Jensen | 65/488 |
| 4,351,664 A | 9/1982 | Bansal | 65/128 |
| 4,973,349 A | 11/1990 | Pernelle et al. | 65/374.13 |
| 5,765,596 A | 6/1998 | LaHaye et al. | 138/38 |
| 5,776,221 A | 7/1998 | Dembicki et al. | 65/121 |
| 5,851,258 A | 12/1998 | Ando et al. | 65/329 |
| 6,799,439 B1 | 10/2004 | Lindskog et al. | 65/29.11 |
| 7,377,132 B2 | 5/2008 | Hamashima et al. | 65/134.2 |
| 7,454,925 B2 | 11/2008 | DeAngelis et al. | 65/324 |
| 7,490,487 B2 | 2/2009 | Singer et al. | 65/346 |
| 2004/0067369 A1 | 4/2004 | Ott et al. | 428/432 |
| 2004/0134235 A1 | 7/2004 | Pitbladdo | 65/346 |
| 2004/0138048 A1 * | 7/2004 | Anderson | 501/107 |
| 2005/0160769 A1 | 7/2005 | Sakai et al. | 65/346 |
| 2005/0229637 A1 | 10/2005 | Hamashima et al. | 65/134.2 |
| 2006/0096322 A1 | 5/2006 | Singer et al. | 65/135.1 |
| 2007/0084247 A1 | 4/2007 | Pitbladdo | 65/346 |
| 2008/0148779 A1 | 6/2008 | Takeshita et al. | 65/134.2 |
| 2010/0199721 A1 | 8/2010 | Antoine et al. | 65/134.9 |
| 2011/0113827 A1 | 5/2011 | De Angelis et al. | 65/29.14 |

FOREIGN PATENT DOCUMENTS

| | | | | |
|---|---|---|---|---|
| CN | 201704191 U | 1/2011 | | C03B 7/02 |
| WO | 2007/020773 | 2/2007 | | C03B 5/42 |

* cited by examiner

*Primary Examiner* — Jodi C Franklin
(74) *Attorney, Agent, or Firm* — Jeffrey A. Schmidt

(57) ABSTRACT

An oblong conduit (13) for conditioning molten glass is disclosed. The wall (23) of the conduit is composed of a precious metal, e.g., a platinum-rhodium alloy, and can be equipped with precious metal tabs (29) for supporting the upper surface (25) of the wall so as to reduce sag of that surface at such times as the conduit is at an elevated temperature and is not filled with glass. The precious metal tabs (29) can be received in channels (31) formed in a refractory support structure (27). The refractory support structure (27) can be a laminate of two layers (33,35), where one of the layers (33) has a smaller grain structure than the other layer (35), the layers being held together by an adhesive (37).

9 Claims, 4 Drawing Sheets

METHODS AND APPARATUS FOR THERMALLY CONDITIONING MOLTEN GLASS

This is a divisional of U.S. patent application Ser. No. 12/619,881 filed on Nov. 17, 2009, the content of which is relied upon and incorporated herein by reference in its entirety, and the benefit of priority under 35 USC §120 is hereby claimed.

FIELD

This disclosure relates to methods and apparatus for thermally conditioning molten glass.

DEFINITIONS

As used herein and in the claims, the term "precious metal" means platinum, grain-stabilized platinum, a platinum alloy, or a grain-stabilized platinum alloy. As a non-limiting example, the term includes a platinum-rhodium alloy such as an alloy of 80 wt. % platinum and 20 wt. % rhodium.

As used herein and in the claims, the term "oblong cross-section" means a cross-section that has the shape of an ellipse, an oval, or a racetrack (i.e., the perimeter of the cross-section has parallel straight sides which are connected at each end by a curve, e.g., a hemisphere, or by a straight section with a curve at each end, e.g., a quarter of a circle at each end). An "oblong conduit" is a conduit having an oblong cross-section.

BACKGROUND

The basic steps in the manufacture of sheet glass, e.g., sheet glass for use as substrates for displays, such as LCD displays, include: (1) melting raw materials, (2) fining (refining) the melt to remove gaseous inclusions, (3) stirring the fined molten glass to achieve chemical and thermal homogeneity, (4) thermally conditioning the homogenized glass to reduce its temperature and thus increase its viscosity, (5) forming the cooled molten glass into a glass ribbon, and (6) separating individual glass sheets from the ribbon. In the case of a downdraw fusion process, the glass ribbon is formed using a forming structure known as an "isopipe," while in a float process, a molten tin bath is used for this purpose.

High temperatures are needed to successfully fine molten glass since the rate of rise of gaseous bubbles through molten glass varies inversely with the viscosity of the glass, i.e., the lower the viscosity, the faster the rate of rise, and the viscosity varies inversely with temperature, i.e., the higher the temperature, the lower the viscosity. Because molten glass is in a finer for only a limited amount of time, achieving a rapid rise of bubbles through the melt is of great importance. Hence, the finer is normally operated at as high a temperature as possible. However, to form molten glass into a ribbon requires viscosities much higher than those used during fining. Hence, the need to thermally condition (cool) the molten glass between fining and forming.

Historically, thermal conditioning has been performed by passing the molten glass through a conduit having a circular cross-section. The conduit has been surrounded by ceramic material and held in a metal frame, and the rate of heat loss from the molten glass has been controlled through the use of direct or indirect heating so as to avoid introducing substantial thermal and flow inhomogeneities into the glass as a result of the cooling process. Because of the high temperature of the molten glass and the need to avoid contamination of the molten glass, the wall of the conduit has been made of a precious metal.

The circular cross-section used in the past has provided a conduit that is intrinsically mechanically stable. Such stability is important because precious metals are expensive and thus to reduce cost, the wall of a conditioning conduit needs to be as thin as possible. Although good for mechanical stability, in accordance with the present disclosure, it has been found that a circular cross-section is not the best in terms of heat transfer. Specifically, it has been found that for various applications, because of their heat transfer properties, conditioning conduits having circular cross-sections need to be longer than the available space. Although it is possible to extend the space used for thermal conditioning, such extensions increase the overall size and thus the cost of the glass manufacturing facility. In addition, increasing the length of a circular conditioning conduit increases the amount of precious metal needed to construct the conduit, thus diminishing the economic benefits associated with the thin walls of such conduits.

The present disclosure addresses this issue with circular conditioning conduits and provides conduits, specifically, oblong conduits, which achieve high rates of heat loss without compromising the transverse thermal flow homogeneity (transverse thermal uniformity) of the molten glass passing through the conduit. In addition, the flow gradients and head losses of molten glass passing through the conduits of the present disclosure are small, which are added benefits of the oblong conduits.

SUMMARY

In accordance with a first aspect, a method is disclosed for thermally conditioning molten glass which includes:
(A) flowing molten glass through a conduit (13) which has:
  (i) a wall (23) made of a precious metal;
  (ii) an entrance face (15) and an exit face (17);
  (iii) an oblong cross-section (9) which has a long axis and a short axis, the long axis being substantially horizontal and the short axis being at an acute angle with respect to vertical; and
  (iv) a width W along the long axis and a height H along the short axis where W and H satisfy the relationship:

$2 \leq W/H \leq 6$; and (B) non-uniformly heating the conduit by applying more heat to the wall (23) of the conduit (13) along the length of the long axis than along the length of the short axis.

In accordance with a second aspect, a method is disclosed for operating a precious metal glass conditioning conduit (13) which includes a wall (23) having an upper surface (25), the method including providing the upper surface (25) with a plurality of precious metal tabs (29) and connecting the precious metal tabs (29) to a refractory support structure (27) so as to reduce sag of the upper surface (25) at such times as the conduit (13) is at an elevated temperature and is not filled with glass.

In accordance with a third aspect, an apparatus is disclosed which includes:
(A) a refractory support structure (27);
(B) a glass conditioning conduit (13) which has:
  (i) a wall (23) composed of a precious metal, the wall having an upper surface (25);

(ii) an oblong cross-section (9) which has a long axis and a short axis, the long axis being substantially horizontal and the short axis being at an acute angle with respect to vertical; and (iii) a width W along the long axis and a height H along the short axis, where W and H satisfy the relationship:

2≤W/H≤6; and (C) a plurality of precious metal tabs (29) which connect the upper surface (25) of the wall (23) to the refractory support structure (27).

The reference numbers used in the above summaries of the various aspects of the disclosure are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

The reference numbers used in the figures correspond to the following:

| 9 | oblong cross section |
|---|---|
| 13 | oblong conduit |
| 15 | entrance face of oblong conduit |
| 17 | exit face of oblong conduit |
| 21 | segment of oblong conduit |
| 23 | precious metal wall of oblong conduit |
| 25 | upper surface of wall of oblong conduit |
| 27 | refractory support structure |
| 29 | precious metal tab |
| 31 | channel in refractory support structure for precious metal tab |
| 33 | first layer of laminate |
| 35 | second layer of laminate |
| 37 | adhesive layer of laminate |
| 39 | groove for heating element |
| 41 | Belleville washer |
| 43 | shaft of precious metal tab |
| 45 | head of precious metal tab |
| 47 | top heating element |
| 48 | bottom heating element |
| 49 | edge heating element |
| 51 | insulation |
| 53 | intersection of conduit's wall with the conduit's short axis |
| 55 | clamp mechanism |

DETAILED DESCRIPTION

Figure 1:
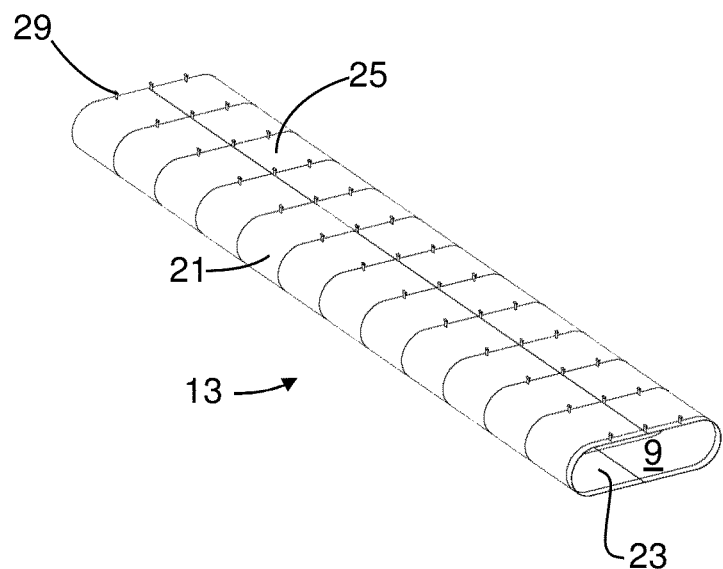
FIG. 1 is a perspective view of an oblong conduit.

FIG. 1 is a perspective view of an embodiment of a conditioning conduit 13 having an oblong cross-section, specifically, a racetrack shape in this case. During use, glass enters the conduit through its entrance face 15 and exits through its exit face 17.

Figure 2:
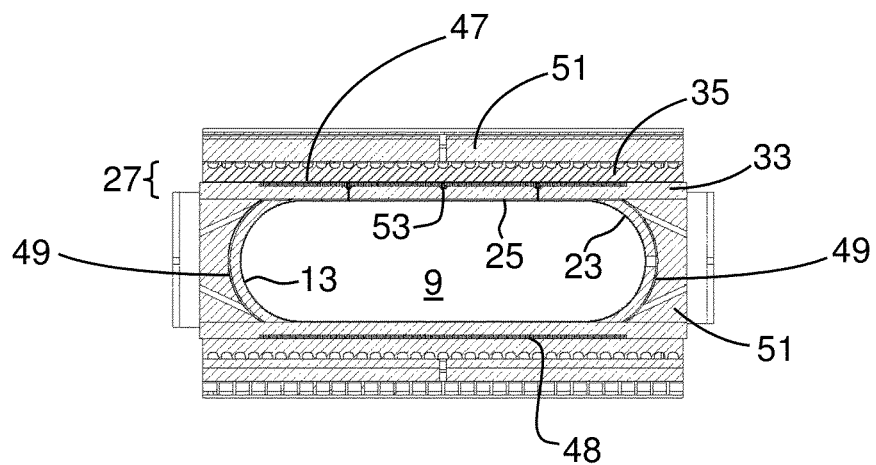
FIG. 2 is a cross-sectional view showing an oblong conduit and an associated refractory support structure.
Figure 3:
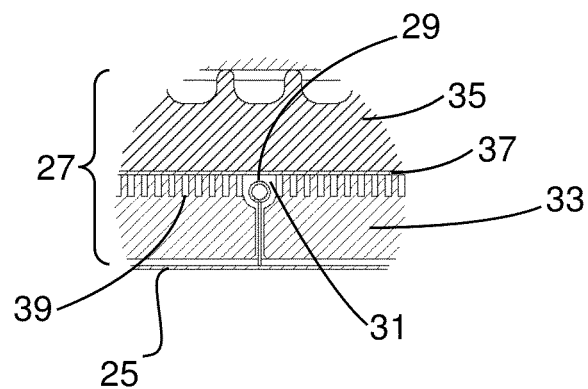
FIG. 3 is a cross-sectional view at an expanded scale showing the left hand precious metal tab of FIG. 2 in greater detail.

As shown in, for example, FIGS. 2-4, when installed, the conduit is surrounded by various layers of insulation 51, e.g., ceramic insulation, some of which may be grooved to receive electrical heating elements (see, for example, grooves 39 of FIG. 4 discussed below). As shown in FIG. 2, the assembly can include a top heating element 47, a bottom heating element 48, and two edge heating elements 49. The insulation and the electrical heating allow the rate of cooling of the molten glass to be controlled as it passes through the conduit. Moreover, as discussed in more detail below in connection with Table 1, by differentially heating the wall of the oblong conduit along its long and short axes, temperature differences between different parts of the molten glass at the conduit's exit face can be reduced.

Figure 5:
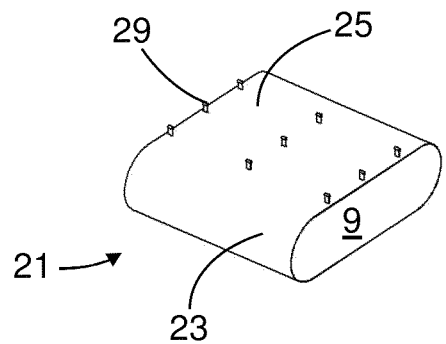
FIG. 5 is a perspective view of a segment of an oblong conduit.

In practice, the conduit can have a variety of dimensions. For example, its length can be on the order of 12 feet (~3.7 meters) and it can have a width W along the oblong's long axis of 30 inches (~76 centimeters) and a height H along the oblong's short axis of 9 inches (~23 centimeters). To facilitate construction, the conduit can be assembled from a plurality of oblong segments, e.g., segments which each have a length of 1 foot (~0.3 meters). An example of such a segment is shown in FIG. 5.

In order to achieve a high rate of cooling of the molten glass while delivering the glass to the forming structure with low temperature and flow gradients, the width to height ratio (W/H ratio) of the oblong conduit is set in the range of 2 to 6. This range also results in low head losses for the glass as it passes through the conduit. Importantly, for an equivalent heat transfer rate and equivalent temperature and flow gradients, a conduit having a circular cross section would need to be 2.5 times longer than an oblong conduit having a W/H ratio of 3.3. In addition, such a circular conduit would have a head loss 16 times greater than the oblong conduit. As known to skilled workers, length is important in managing thermal expansion of precious metal systems and in minimizing building floor space. Also, head loss is an important variable in maintaining uniform glass flow which is important to virtually all forming methods and particularly important for the downdraw fusion forming process.

In accordance with an exemplary embodiment, the oblong conduit is at least 3 meters long and, when performing thermal conditioning, is filled with molten glass which (1) flows at a rate of at least 800 kilograms/hour (~1800 lbs/hour) and (2) cools at an average rate of at least 30° C. per meter between the conduit's entrance and exit faces. By applying more heat to the wall of the conduit along the length of the conduit's long axis than along the length of its short axis, the calculated temperature difference of the molten glass at the exit face between (a) the center of the conduit and (b) the intersection of the conduit's short axis with the conduit's wall (see point 53 in FIG. 2) can be made less than or equal to 15° C., assuming a uniform temperature distribution at the entrance face.

Figure 6:
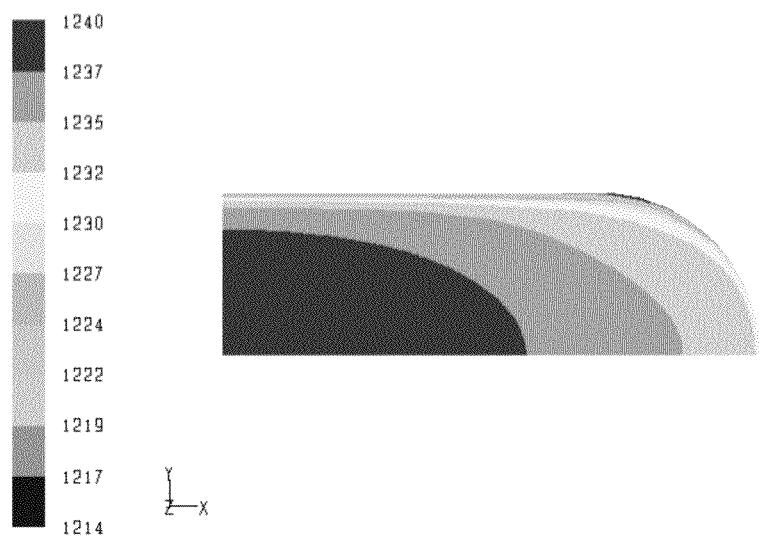
FIG. 6 is a calculated temperature distribution for the exit face of an oblong conduit.

This ability to produce a substantially uniform temperature distribution at the exit face is illustrated in Table 1 and FIG. 6. In particular, the first six rows of Table 1 show the input data that was provided to a computer model of an oblong conduit having the dimensions set forth above, and the next four rows set forth calculated temperature values at the exit face of the conduit obtained using the model. The insulation in contact with the wall of the conduit (see row 5 in Table 1) was assumed to have the properties of ZEDCOR 98 alumina. FIG. 6 shows the temperature profile at the exit face of the conduit obtained using this data. As can be seen from this figure and from the last two rows of Table 1, the oblong conduit with the differential heating gave a calculated thermal gradient across the exit face of the conduit of less than 15° C. for a variety of typical glass flows, power inputs, and insulation thicknesses.

The calculations reported in Table 1 and FIG. 6 were performed using the commercially-available FLUENT brand CFD modeling software (ANSYS, Inc., Canonsburg, Pa.). Other commercially-available programs, as well as custom software packages, can be used in place of or in combination with the FLUENT program to make these calculations.

In view of the foregoing, a design process for achieving a desired level of thermal conditioning can include the following five steps:

First, based on the desired glass flow rate, temperature drop along the length of the conduit, and level of inputted control power, the heat transfer load (BTU/hour) is calculated for the conduit. For an initial trial, a control power that is 10% of the glass heat transfer amount has been found to work successfully.

Second, the precious metal surface area is calculated using an appropriate heat transfer rate for the material of conduit's wall, e.g., a heat transfer rate between 3,000 and 5,000 BTU/S.F./hour for an 80-20 platinum-rhodium alloy.

Third, an oblong conduit cross section and tube length is selected that provides the calculated surface area, the W/H ratio of the oblong's cross section being in the range of 2 to 6.

Fourth, using CFD software, the thermal profile, flow profile, and temperature gradients at the exit face of the conduit are calculated.

Fifth, if necessary, the cross section shape and/or the length of the conduit is revised to achieve the desired temperature drop and thermal and flow homogeneity levels.

When in use and performing its thermal conditioning function, conduit 13 is completely filled with molten glass. Under these conditions, the glass exerts a hydrostatic pressure against the wall of the conduit holding it in place. However, on occasion, e.g., during start up or when the system needs to be drained of glass for repair, conduit 13 can be at an elevated temperature and not filled with glass for an extended period of time, e.g., for a period on the order of 14 days. Under these conditions, the upper surface 25 of wall 23 can sag, thus jeopardizing the integrity of the conduit, especially when molten glass is again introduced into the system.

This sag problem can be addressed by increasing the thickness of the wall so that the upper surface 25 will hold its configuration even in the absence of molten glass. However, because of the cost of precious metals, increasing the wall thickness is an expensive solution to the sag problem.

Figure 4:
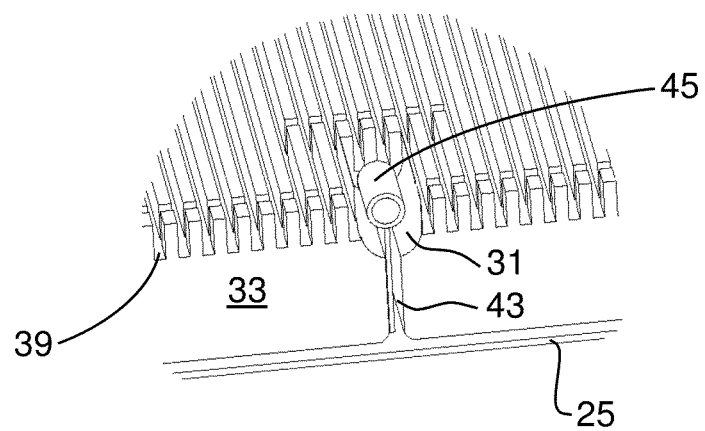
FIG. 4 is a perspective view showing a precious metal tab and a channel in a refractory support structure which receives the tab.

As illustrated in FIGS. 1-5, in accordance with one embodiment, the sag problem can be addressed by providing upper surface 25 of the wall of the conduit with a plurality of precious metal tabs 29 arranged in one or multiple rows along the length of the conduit. As shown in FIG. 4, the tabs can be composed of a shaft 43 and a head 45. Other configurations besides that shown in FIG. 4 can be used if desired. The tabs can be attached to the upper surface of the conduit by, for example, welding. For a conduit composed of segments, one tab or one transverse set of tabs can be attached to each segment as illustrated in FIG. 1 or multiple tabs or multiple transverse sets of tabs can be used for each segment as illustrated in FIG. 5.

During assembly of the conditioning system, the precious metal tabs are connected to a refractory support structure 27 by means of channels 31 formed in the support structure. The channels are longer than the head portion of the tabs to allow for differential expansion of the conduit and the refractory support as the conditioning unit is heated up to its operating temperature. In addition to providing support for the conduit during times when the conduit is not filled with glass, the support structure can also restrain the upper surface of the conduit from bulging outward due to hydrostatic pressure when the conduit is filled with molten glass.

Figure 7:
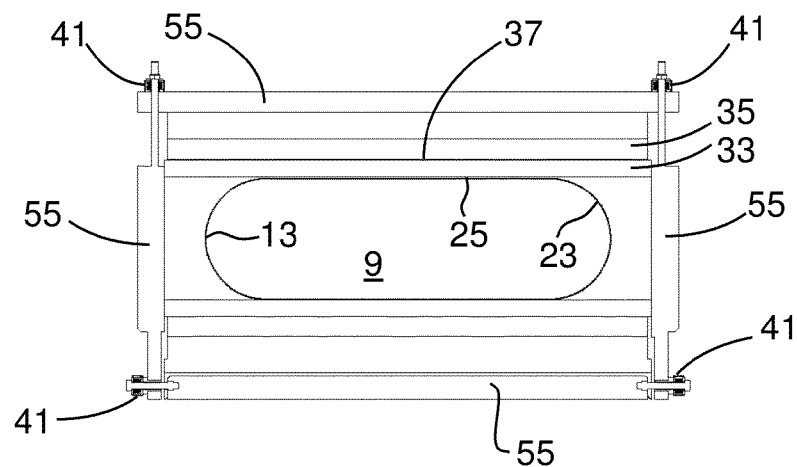
FIG. 7 is a schematic drawing illustrating the use of Belleville washers to apply a compressive force to a first layer of a laminate which forms part of a refractory support structure.

In accordance with a further embodiment, the refractory support structure 27 can be a laminate of at least two layers composed of different refractory materials. Such a laminate is particularly helpful for support structures which span a distance of 20 inches (~50 centimeters) or more, but can also be used for shorter spans. As one example, the laminate can be composed of a first layer 33 which has a smaller grain structure and a second layer 35 which has a larger grain structure. The smaller grain structure allows the first layer to be machined so that it can contain channels 31 for tabs 29, as well as grooves 39 for receiving heating elements (not shown). While the smaller grain structure facilitates machining, it also increases the probability that the first layer will fracture when heated to operating temperature. Laminating a second layer having a larger grain structure to the first layer addresses this problem, since the larger grain structure makes it less likely that the second layer will fracture as it is heated up. In addition, as illustrated in FIG. 7, a compressive force can be applied to the first layer of the laminate to place that layer into compression. Such compression makes it less likely that the first layer will fracture while being heated up and during use. Also, if it does fracture, the compressive force will tend to hold the resulting pieces of the layer in place. Various mechanisms can be used to provide the compressive force, a convenient one being through the use of one or more Belleville washers 41 acting through a clamp mechanism 55.

The first and second layers of the laminate can be composed of a variety of refractory materials. For example, both layers can be high alumina refractories, such as ZEDCOR for the first layer and AN485 for the second layer. Similarly, a variety of high temperature adhesives (cements) can be used for the laminate's adhesive layer 37. The adhesive should have good bonding strength, high temperature strength, high resistivity, good dielectric strength, and a coefficient of expansion similar to the materials being bonded. Adhesives having an operating temperature greater than or equal to 1650° C. will generally be suitable. For example, CERAMA-BOND 503 manufactured by Aremco Products, Inc., Valley Cottage, N.Y., has been found to work successfully for AN485 and ZEDCOR slabs.

Figure 8:
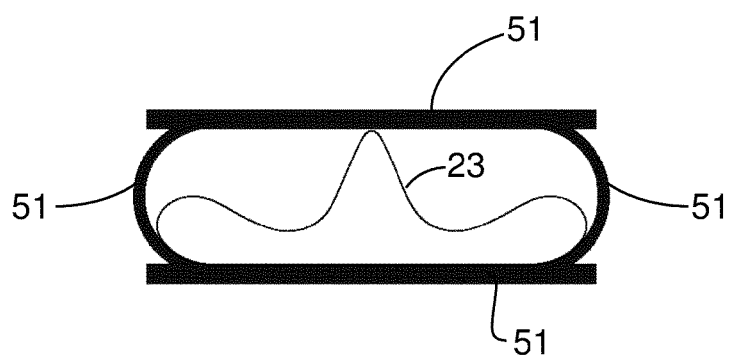
FIG. 8 is a calculated configuration of an empty oblong conduit held at 1400° C. for an extended period of time and having a wall thickness of 0.040" (~1.0 millimeters).

Even with the use of tabs 29, if the wall of the conduit is too thin, the upper portion of the wall can deform at elevated temperatures when the conduit is not filled with molten glass for an extended period of time. Such deformation is illustrated in FIG. 8. The conduit configuration shown in this figure was calculated using ANSYS stress analysis software, assuming a holding temperature of 1400° C. and a conduit having the dimensions set forth above and composed of an 80/20 platinum-rhodium alloy. The conduit was assumed to be equipped with support tabs along its midline. (For the purposes of the calculation, the support was assumed to be uniformly distributed along the length of the conduit.) The wall thickness for the calculation was 0.040 inches (~1.0 millimeters). The extensive deformation exhibited by the upper surface of the conduit is evident in this figure.

Figure 9:
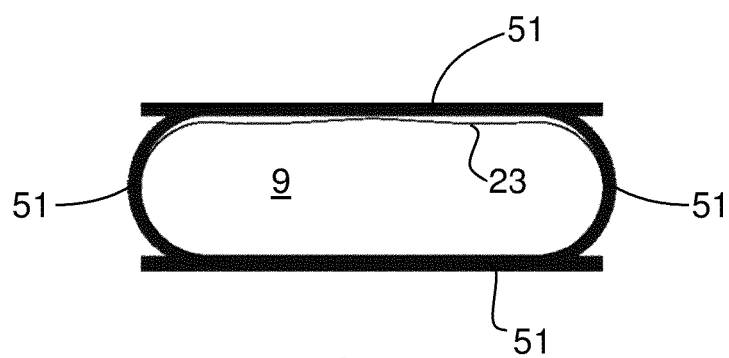
FIG. 9 is a calculated configuration for the conduit of FIG. 8 but with a wall thickness of 0.060" (~1.5 millimeters).

FIG. 9 shows the same calculation performed with a wall thickness of 0.060 inches (~1.5 millimeters). As can be seen, the wall of the conduit still sags but the amount of sag is much smaller and will not jeopardize the integrity of the conduit when molten glass is introduced into the system. In general, it has been found that a wall thickness in the range of 1.2 to 1.9 millimeters will reduce the maximum sag of the upper surface of the wall to the acceptable level of less than 10% of the height of the conduit (<0.1·H) when the conduit is held at 1400° C. for a period of 14 days.

A variety of modifications that do not depart from the scope and spirit of the invention will be evident to persons of ordinary skill in the art from the foregoing disclosure. For example, although the above discussion has been in terms of the production of sheet glass, the disclosure is applicable to other glass making processes such as those used to produce optical glass. The following claims are intended to cover the specific embodiments set forth herein as well as modifications, variations, and equivalents of those embodiments.

TABLE 1

| 1 | Glass Flow (lbs/hr) | >1800 | >1800 | >1800 | >1800 |
|---|---|---|---|---|---|
| 2 | Total Power (kW) | 20 | 14 | 14 | 32 |
| 3 | Long-axis power (kW) | 14 | 10 | 10 | 20 |
| 4 | Short-axis power (kW) | 6 | 4 | 4 | 12 |
| 5 | Insulation thickness | 1" | 1" | 1.5" | 1.5" |
| 6 | T-in (deg C.) | 1400 | 1400 | 1400 | 1400 |
| 7 | T-out (deg C.) | 1238 | 1227 | 1238 | 1240 |
| 8 | dT (in-out) (deg C.) | 162 | 173 | 162 | 160 |
| 9 | dT (Center to end of short axis) (deg C.) | 10 | 10 | ~10 | 10 |
| 10 | dT (Center to end of long axis) (deg C.) | 7 | 8 | ~9 | ~10 |

What is claimed is:

1. A method of operating a precious metal glass conditioning conduit which comprises a wall having an upper surface disposed above a center axis of the conduit, the method comprising heating the precious metal glass conditioning conduit when the conduit is not filled with glass, providing the upper surface with a plurality of precious metal tabs and connecting the precious metal tabs to a refractory support structure so as to reduce sag of the upper surface toward the center axis of the conduit at such times as the conduit is at an elevated temperature and is not filled with glass, and then filling the heated precious metal glass conditioning conduit with glass.

2. The method of claim 1 wherein:
   (a) the conduit has an oblong cross-section which has a long axis and a short axis, the long axis being substantially horizontal and the short axis being at an acute angle with respect to vertical;
   (b) the conduit has a width W along the long axis and a height H along the short axis, where W and H satisfy the relationship:

2≤W/H≤6;

(c) the wall has a thickness t which in millimeters satisfies the relationship:

1.2≤t≤1.9; and (d) when subjected to a temperature of 1400° C. for a period of 14 days, the maximum sag of the wall's upper surface is less than 0.1·H.

3. The method of claim 1 wherein the precious metal tabs are arranged in a line along a centerline of the upper surface of the wall.

4. The method of claim 1 wherein the precious metal tabs are arranged in three lines, one along a centerline of the upper surface of the wall and the remaining two, parallel to and on opposite sides of the centerline.

5. The method of claim 1 wherein the connecting of the precious metal tabs to a refractory support structure comprises inserting the tabs in one or more channels formed in the support structure.

6. The method of claim 5, wherein the tab includes a shaft and a head, wherein the head has a dimension greater than that of the shaft and greater than that of a portion of the channel that receives the shaft of the precious metal tab.

7. The method of claim 1 comprising applying pressure to the upper surface of the wall using the refractory support structure so as to restrain the upper surface from deforming outward due to hydrostatic pressure exerted on the upper surface by molten glass flowing through the conduit.

8. The method of claim 1 wherein:
   (a) the refractory support structure comprises a laminate which comprises a first layer affixed to a second layer by an adhesive, the first and second layers being composed of different refractory materials and the first layer being located closer to the conduit than the second layer; and
   (b) the method comprises applying a compressive force to the first layer.

9. The method of claim 1, wherein the heating includes heating to a temperature of at least 1400° C.

* * * * *